Jan. 28, 1964 H. LÖW 3,119,162
CLAMPING DEVICE
Filed Nov. 6, 1961 2 Sheets-Sheet 1

INVENTOR
HERMANN LÖW

BY *Lowry & Rinehart*

ATTORNEYS

Jan. 28, 1964  H. LÖW  3,119,162
CLAMPING DEVICE
Filed Nov. 6, 1961  2 Sheets-Sheet 2
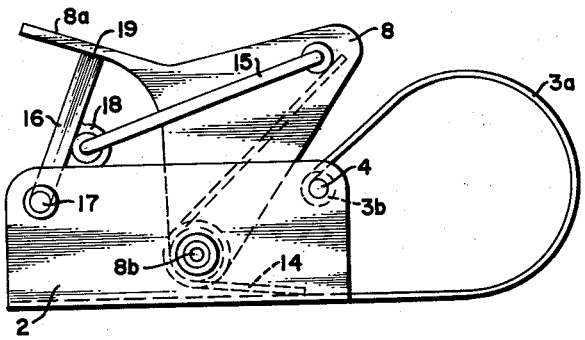
FIG. 7
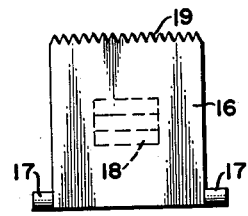
FIG. 8
FIG. 9
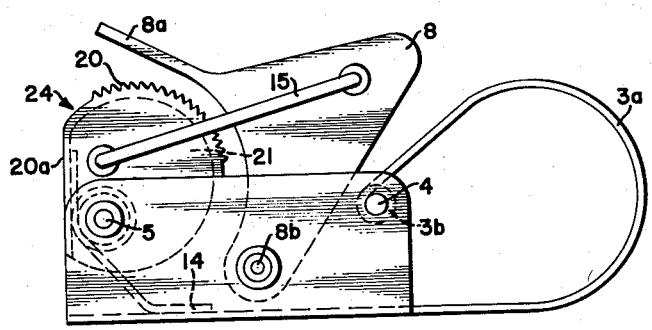
FIG. 10
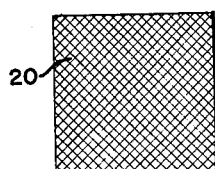
FIG. 11
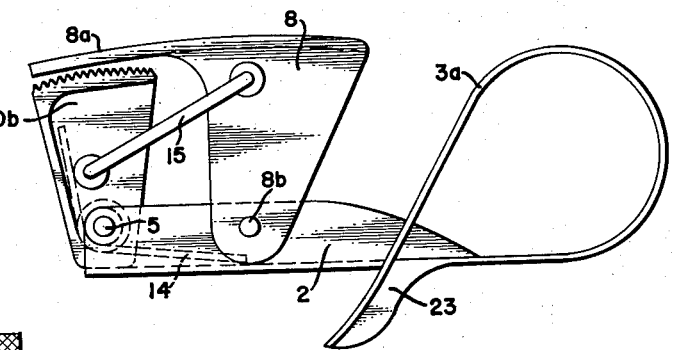
FIG. 12
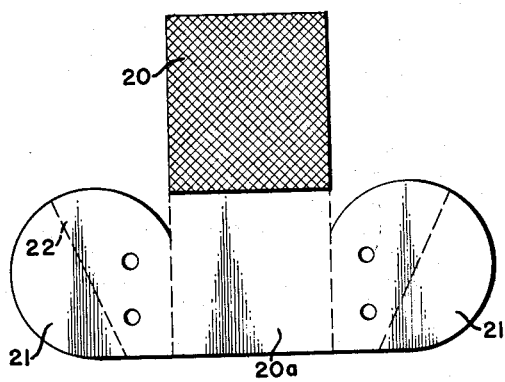
INVENTOR
HERMANN LÖW
BY  Lowry & Rinehart
ATTORNEYS

United States Patent Office 3,119,162
Patented Jan. 28, 1964

3,119,162
CLAMPING DEVICE
Hermann Löw, 133 Talstrasse, Schriesheim an der
Bergstrasse, Germany
Filed Nov. 6, 1961, Ser. No. 150,218
Claims priority, application Germany Nov. 9, 1960
3 Claims. (Cl. 24—253)

This invention relates to a clamping device which among other purposes serves for clamping braces or suspenders to a waistband. The clamping device may also be used wherever it is intended to clamp a material temporarily or for a relatively long period of time, for example a tarpaulin which is to cover a vehicle.

The clamping device according to the invention makes use, as the known devices intended for clamping purposes do, of a spring the pressure of which causes clamping elements known per se to be put under tension. These clamping elements each of which serves as an abutment for the other, effect automatically a clamping action. As compared with the known clamping devices, the clamping device according to the invention has the advantage that it comprises very simple component parts which are arranged to cooperate in such a manner that extremely thin material as well as material of a thickness of up to 10 mm. can be clamped. By this advantage the clamping device according to the invention is superior to all known clamping devices, especially because with the known clamping devices materials of a thickness exceeding 3 to 4 mm. cannot be clamped.

The invention provides a clamping device which comprises a U-shaped housing, a first clamping element pivotally mounted in said housing, a second clamping element pivoted to said housing, said first clamping element acting as an abutment for said second clamping element, a spring arranged in said housing and acting upon one of said clamping elements, and a link eccentrically mounted in both clamping elements and connecting the same.

Expediently, the second clamping element comprises a clamping stirrup.

Important features of the invention relate to the manner of mounting and constructing the clamping stirrup and the abutment. The clamping action between the clamping stirrup and the abutment is obtained through the connecting link eccentrically mounted in the clamping elements. This link converts the spring force into clamping force.

Several preferred embodiments of the invention will now be described by way of example and with reference to the accompanying drawings, in which:

FIG. 7 is a side elevational view of a third embodiment of the clamping device in operative or clamping position;

FIG. 8 is a front elevational view of the abutment used in the clamping device of FIG. 7;

FIG. 9 is a side elevational view thereof;

FIG. 10 is a side elevational view of a fourth embodiment of the clamping device shown in material receiving position;

FIG. 11 is a top plan view of a blank from which the abutment of the clamping device of FIG. 10 is made;

FIG. 12 is a side elevational view of a fifth embodiment of the clamping device in operative or clamping position.

Figure 1:
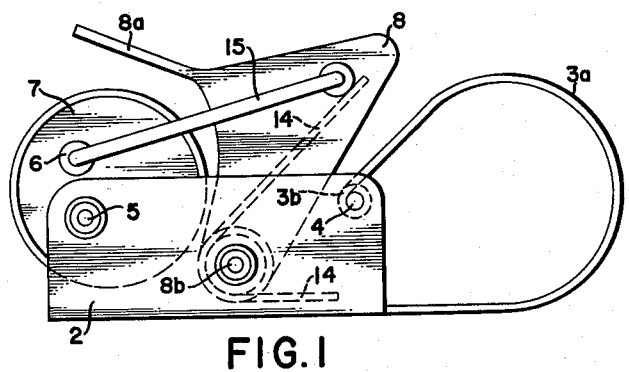
FIG. 1 is a side elevational view of a first embodiment of a clamping device according to the invention, shown in material receiving position.
Figure 2:
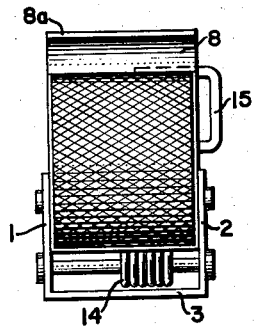
FIG. 2 is an end view thereof, seen from the left-hand side of FIG. 1.
Figure 3:
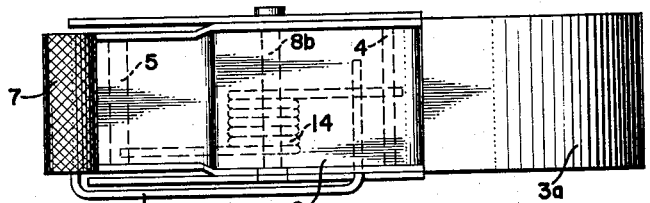
FIG. 3 is a top plan view of the clamping device shown in FIGS. 1 and 2.

Referring now to the drawings, FIGS. 1 to 3 show a clamping device which consists of a U-shaped housing of sheet metal having legs 1 and 2 and a web 3 therebetween. The web 3 is extended at one end and forms an ear-like handle 3a. The free end 3b of the handle 3a is bent around a transverse pin 4 connecting the legs 1 and 2 of the housing. Alternatively, the free end of the handle 3a may have two lateral lugs which engage in bores in the legs 1 and 2 so that the transverse pin 4 can be dispensed with.

At the end of the housing remote from the handle 3a there is carried by the legs 1 and 2 a transverse pivot 5 on which a roller 7 having a roughened surface is eccentrically mounted. The roller 7 serves as an abutment for a clamping plate 8a of a clamping stirrup 8 of inverted U-shape which is mounted on a transverse pivot 8b engaging in the legs 1 and 2 of the housing. A wire coil spring 14 is wound around the pivot 8b and bears with one of its ends against the inner surface of the web 3 of the housing of the clamping device and with its other end against one of the bent-off ends of a connecting link 15 which, on the one hand, eccentrically engages in one leg of the U-shaped stirrup 8 and, on the other hand, with its opposite bent-off end in an eccentric bore 6 in one end face of the roller 7, thus connecting the clamping stirrup 8 to the roller 7, the spring 14 acting upon the clamping stirrup 8 via the connecting link 15 so as to normally hold the clamping plate 8a of the clamping stirrup 8 in contact with the roughened surface of the roller 7.

When the clamping stirrup 8 is being depressed by the thumb of a user against the action of the spring 14 towards the handle 3a, the connecting link 15 causes the roller 7 to move by about 1 to 2 tenths of its circumference inwardly into the housing of the clamping device while the roller 7 and the clamping stirrup 8 are separated for the introduction therebetween of material to be clamped. Thereby the roller 7 and the clamping stirrup 8 are subjected to initial stress which considerably increases the clamping action thereof after the material to be clamped has been introduced and the clamping stirrup 8 released. The clamping stirrup 8 is not excessively stressed during the operation of the clamping device since its pivotal mounting and its width of opening permit the material to be clamped to be easily removed.

Figure 5:
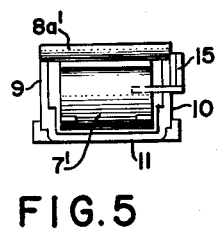
FIG. 5 is a view similar to that shown in FIG. 2.
Figure 4:
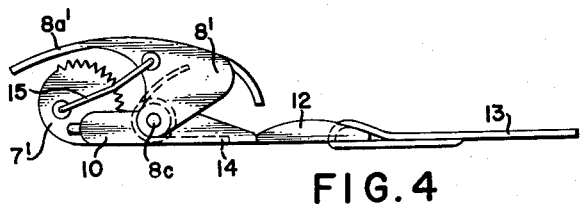
FIG. 4 is a side elevational view of a second embodiment of the clamping device in operative or clamping position.
Figure 6:
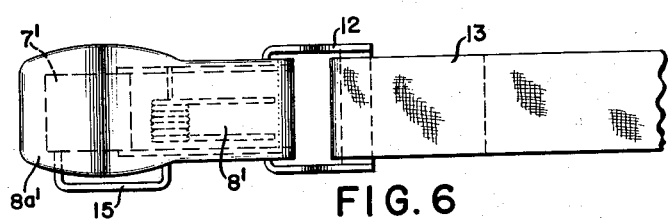
FIG. 6 is a top plan view of the clamping device shown in FIG. 4.

FIGS. 4 to 6 show another embodiment of the clamping device wherein a U-shaped housing comprises legs 9 and 10 and a web 11 which projects at one end beyond said legs. This web 11 is provided at the latter end with an eye 12 for the attachment thereto of a textile band 13, for example a suspender. At the end of the housing remote from the eye 12 the legs 9 and 10 are provided with inwardly directed lugs on which a roller 7¹ transversely fluted over part of its surface is eccentrically rotatably mounted. The roller 7¹ serves as an abutment for the clamping plate 8a¹ of a clamping stirrup 8¹ of inverted U-shape which is mounted externally of the housing of the clamping device on a pivot 8c. In this embodiment, the wire coil spring 14 wound around the pivot 8c bears with one of its ends against the inner surface of the web 11 of the housing and with its other end against the inner surface of the web of the U-shaped clamping stirrup 8¹. The roller 7¹ and the clamping stirrup 8¹ are connected by a connecting link 15, as in the embodiment illustrated in FIGS. 1 to 3.

FIGS. 7 to 9 show a further embodiment of the clamping device, wherein all parts correspond to those illustrated in the embodiment shown in FIGS. 1 to 3, with the exception of a plate 16 which is substituted for the roller 7 with the pivot 5. The plate 16 has at its lower end outwardly directed lugs 17 by means of which it is pivotally mounted in the legs 1 and 2 of the housing. Formed on the inner surface of the plate 16 is a lug 18 in which engages one of the bent-off ends of the connecting link 15. At its upper end the plate 16 has preferably corrugations or teeth 19 to provide a good gripping surface for the material to be clamped.

FIGS. 10 and 11 show still another embodiment of the clamping device wherein a hollow member 24 open at the bottom and composed of a curved portion 20 having a roughened upper surface and a smooth vertical portion 20a with lugs 21 forming the side walls of the hollow member 24 is substituted for the roller 7 of the embodiment illustrated in FIGS. 1 to 3, whereas the remaining parts of the clamping device correspond to those shown in FIGS. 1 to 3, the coil spring 14 being wound around the pivot 5 instead of around the pivot 8b and bearing with its one end against the inner surface of the web of the housing and with its other end against the inner surface of the smooth vertical portion 20a of the hollow member 24. FIG. 11 shows a blank from which the hollow member 24 is made. Alternatively, the hollow member 24 may have outwardly directed studs on its legs 21 by means of which it is rotatably mounted in the legs of the housing, whereby the pivot 5 is dispensed with.

Figure 13:
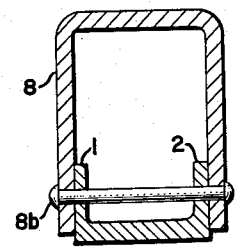
FIG. 13 is a sectional view of the clamping stirrup of the clamping device of FIG. 12.

According to the embodiment of the clamping device shown in FIGS. 12 and 13, the legs 1 and 2 of the housing have a height smaller than that in the embodiments already described. The free end of the handle 3a extends through an opening in the web of the housing to form a suspension hook 23. On the pivot 5 there is mounted a hollow member 20b composed of a smooth portion and a portion with a roughened surface which are disposed perpendicularly to each other, the smooth portion having lugs forming the side walls of the hollow member and terminating along the dash lines 22 in the blank shown in FIG. 11, from which this hollow member 20b is likewise made. The clamping stirrup 8 with the clamping plate 8a is shaped to conform to the particular construction of the hollow member. The remaining parts of the clamping device correspond to those shown in FIG. 10. This construction of the clamping device is characterized by a particularly advantageous application of opening pressure via the connecting link 15.

It is self-evident that instead of a wire coil spring as shown and described also a leaf spring may be used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A clamping device comprising a U-shaped housing, a clamping roller of substantially cylindrical shape having end walls eccentrically mounted between the legs of said U-shaped housing, a clamping element of generally inverted U-shaped configuration having its legs pivotally mounted between the legs of said U-shaped housing, a clamping plate extending from the bight of said U-shaped clamping element and overlying said clamping roller, a link extending between the legs of said inverted U-shaped clamping element and connected at one end to an end wall of said clamping roller at a point offset from the eccentric mounting thereof, and spring means biasing said clamping plate towards said clamping roller.

2. The structure of claim 1 wherein said clamping roller includes a roughened clamping portion adjacent said clamping plate.

3. The structure of claim 2 wherein said inverted U-shaped clamping element has a flattened bight portion extending away from said clamping plate beyond the pivoted connection of said clamping element with said housing, and said link is connected at its other end to said clamping element at a point adjacent the end of said flattened portion remote from said clamping plate and at a radial distance from the pivot point of said clamping element greater than the radial distance of said one end of said link from the eccentric mounting of said clamping roller, whereby pressure on said flattened bight portion rotates said clamping plate and said clamping roller in the same direction but through greater distances to separate said plate from the roughened surface of said roller to permit the insertion of material to be clamped therebetween.

References Cited in the file of this patent

UNITED STATES PATENTS

| | | |
|---|---|---|
| 194,040 | Houghton | Aug. 14, 1877 |
| 1,127,188 | Cole | Feb. 2, 1915 |
| 1,192,851 | Brorby | Aug. 1, 1916 |
| 1,276,125 | Sherburne et al. | Aug. 20, 1918 |
| 1,392,968 | Robinson | Oct. 11, 1921 |
| 1,509,303 | Leyare et al. | Sept. 23, 1924 |
| 1,590,089 | Heath | June 22, 1926 |
| 2,429,358 | Kamiss | Oct. 21, 1947 |

FOREIGN PATENTS

| | | |
|---|---|---|
| 557,417 | Great Britain | Nov. 19, 1943 |
| 583,983 | Great Britain | Jan. 3, 1947 |